US006533292B2

(12) United States Patent
Fant

(10) Patent No.: US 6,533,292 B2
(45) Date of Patent: Mar. 18, 2003

(54) PULL-TO-CLOSE COLLET CHUCK

(75) Inventor: James A. Fant, Chesterton, IN (US)

(73) Assignee: Production Dynamics, Valparaiso, IN (US)

( * ) Notice: Subject to any disclaimer, the term of this patent is extended or adjusted under 35 U.S.C. 154(b) by 0 days.

(21) Appl. No.: 09/812,805

(22) Filed: Mar. 20, 2001

(65) Prior Publication Data
US 2001/0028150 A1 Oct. 11, 2001

Related U.S. Application Data
(60) Provisional application No. 60/191,024, filed on Mar. 20, 2000.

(51) Int. Cl.[7] .............................................. B23B 31/20
(52) U.S. Cl. .............................. 279/43; 279/50; 279/57
(58) Field of Search ............................... 279/43, 50, 51, 279/57, 127

(56) References Cited
U.S. PATENT DOCUMENTS

| 3,125,913 A | | 3/1964 | Smrekar |
| 3,174,766 A | | 3/1965 | Cox et al. |
| 3,228,706 A | | 1/1966 | Smrekar |
| 3,434,730 A | | 3/1969 | Smrekar |
| 3,451,314 A | | 6/1969 | Smrekar |
| 3,595,593 A | * | 7/1971 | Gold .......................... 269/281 |
| 3,921,993 A | * | 11/1975 | Ingham et al. ............... 279/137 |
| 3,926,447 A | * | 12/1975 | Cox, Jr. ........................ 279/137 |
| 4,094,521 A | * | 6/1978 | Piotrowski ................. 279/4.09 |
| 4,418,925 A | * | 12/1983 | Nowak .......................... 279/50 |
| 4,509,765 A | * | 4/1985 | Nowak ........................ 279/146 |
| 4,574,460 A | * | 3/1986 | Bair .............................. 279/50 |
| 4,867,463 A | * | 9/1989 | Hopf .......................... 279/46.7 |
| 6,257,595 B1 | * | 7/2001 | Difasi et al. ................... 279/50 |
| 2001/0028150 A1 | * | 10/2001 | Fant ............................. 279/50 |

FOREIGN PATENT DOCUMENTS

GB          1521962          *  8/1978   .................. 279/50

* cited by examiner

Primary Examiner—Raleigh W. Chiu
(74) Attorney, Agent, or Firm—Gary M. Hartman; Domenica N. S. Hartman

(57) ABSTRACT

A pull-to-close collet chuck for use with lathes equipped with servo-type bar loaders. The chuck is configured to be coupled to a lathe drawtube and translates linear movement of the drawtube to a work-gripping action to a collet. The chuck generally includes a ramp body surrounding a first portion of the collet and integral means for fixing the ramp body within a central bore of the chuck. A piston surrounds the collet and has a bearing surface adjacent a ramp surface of the ramp body, and a wedge is located between the ramp surface of the ramp body and the bearing surface of the piston. The wedge has multiple bearing surfaces through which the work gripping action is transferred from the piston to the collet as a result of radial inward movement of the wedge.

20 Claims, 4 Drawing Sheets

PULL-TO-CLOSE COLLET CHUCK

CROSS REFERENCE TO RELATED APPLICATIONS

This application claims the benefit of U.S. Provisional Application No. 60/191,024, filed Mar. 20, 2000.

STATEMENT REGARDING FEDERALLY SPONSORED RESEARCH

Not applicable.

BACKGROUND OF THE INVENTION

The present invention generally relates to chucks for holding workpieces. More particularly, this invention relates to a pull-to-close collet chuck for use with lathes equipped with servo-type bar loaders, in which the chuck provides for dead length positioning by preventing movement of bar stock during closing of the collet.

Chucks are often used on lathes, screw machines and other machines for holding workpieces during machining operations. In lathes used to machine bar stock, chucks serve to mount workpieces to the rotating spindle of the lathe and accurately align the workpiece with the cutting tool. Chucks may be equipped with collets which, as is well known in the art, are roughly tubular-shaped with equiangularly-spaced slots in one end to delineate multiple resilient fingers capable of gripping a workpiece disposed within the bore of the collet. Servo-type bar loaders enable bar stock to be automatically fed through a collet chuck, with the axial position of the bar stock often being established by a stop provided by the lathe. Dead length positioning (also known as true position, true length positioning, and fixed length positioning) chucks eliminate the requirement for a stop on the lathe, instead relying on a single stop associated with the bar loader. However, for accurate axial positioning, a dead length positioning chuck must be capable of preventing movement of the bar stock during closing of the collet. In U.S. Pat. No. 3,434,730 to Smrekar, a dead length positioning collet chuck is disclosed in which a sleeve surrounds the end of a collet in which the resilient fingers are formed. The collet is fixed within the chuck, while the sleeve is adapted to be axially actuated relative to the sleeve by a cam and roller assembly. The sleeve and the collet end have cooperating camming surfaces so that upon axial movement of the sleeve into engagement with the collet end, the resilient fingers of the collet are compressed inward to chuck or hold bar stock within the collet.

While collet chucks of the type taught by Smrekar have been successfully used for many years, further improvements in collet chucks are desired, particularly where greater gripping forces are necessary to support larger bar stock.

BRIEF SUMMARY OF THE INVENTION

The present invention provides a pull-to-close collet chuck for use with lathes equipped with servo-type bar loaders. Similar to prior art chucks used with servo-type bar loaders, the chuck is configured to be coupled to a lathe drawtube and translates linear movement of the drawtube to a work-gripping action at the collet. The chuck provides for dead length positioning by preventing movement of bar stock as the collet is closed, eliminating the need for a stock stop on the lathe. Instead, bar stock is held securely against a stop on the bar loader during the closing phase of the chuck. The chuck is constructed to promote the strength, rigidity and long wear life of its internal components.

The chuck of this invention generally includes a housing with a bore therein that defines a longitudinal axis. A collet is disposed within the bore of the housing, and is configured to include a first portion, a collapsible second portion, and a bore that is substantially coaxial with the bore of the housing. A ramp body is also disposed within the bore and surrounds the first portion of the collet, with the collet being removably secured within the ramp body by any appropriate means. The ramp body is formed to include integral means for securing the ramp body to the housing. The ramp body defines has a ramp surface that is substantially transverse to the longitudinal axis of the housing. A piston surrounds the collet and has a bearing surface adjacent the ramp surface of the ramp body. The piston is longitudinally reciprocable within the bore by a suitable actuating means. Also within the housing is a wedge located between the ramp surface of the ramp body and the bearing surface of the piston. According to the invention, the wedge differs from ball and roller bearings conventionally employed in collet chucks by having multiple bearing surfaces that provide surface-to-surface contact (as opposed to point or line contact provided by ball and roller bearings, respectively) through which the work gripping action is transferred to the collet. Two of the bearing surfaces cam against the ramp surface of the ramp body and the bearing surface of the piston, so that the wedge moves radially inward toward the collet when the piston moves toward the ramp body. Finally, the chuck includes means engaged with a third bearing surface of the wedge for causing the second portion of the collet to collapse radially inward to grip the workpiece when the wedge moves radially inward toward the collet.

The chuck of this invention is extremely rugged in terms of the strength and rigidity of its internal structure, including the manner in which the ramp body is held fast within the housing and the configuration of the wedge, whose bearing surfaces allow for better force distribution with the mating surfaces of the piston and ramp body.

Other objects and advantages of this invention will be better appreciated from the following detailed description.

DETAILED DESCRIPTION OF THE INVENTION

Figure 1:
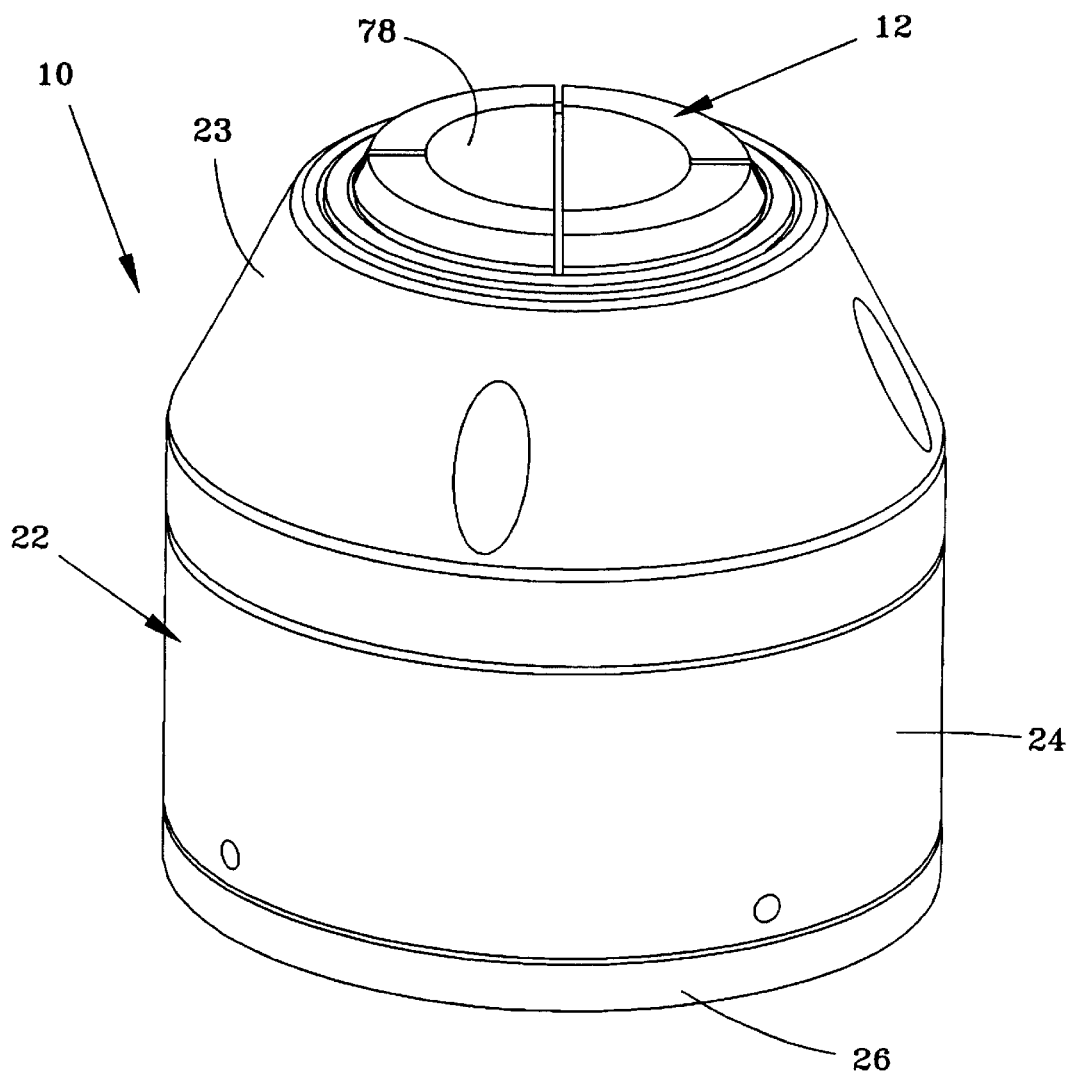
FIG. 1 is an exterior perspective view of a collet chuck in accordance with the present invention.
Figure 2:
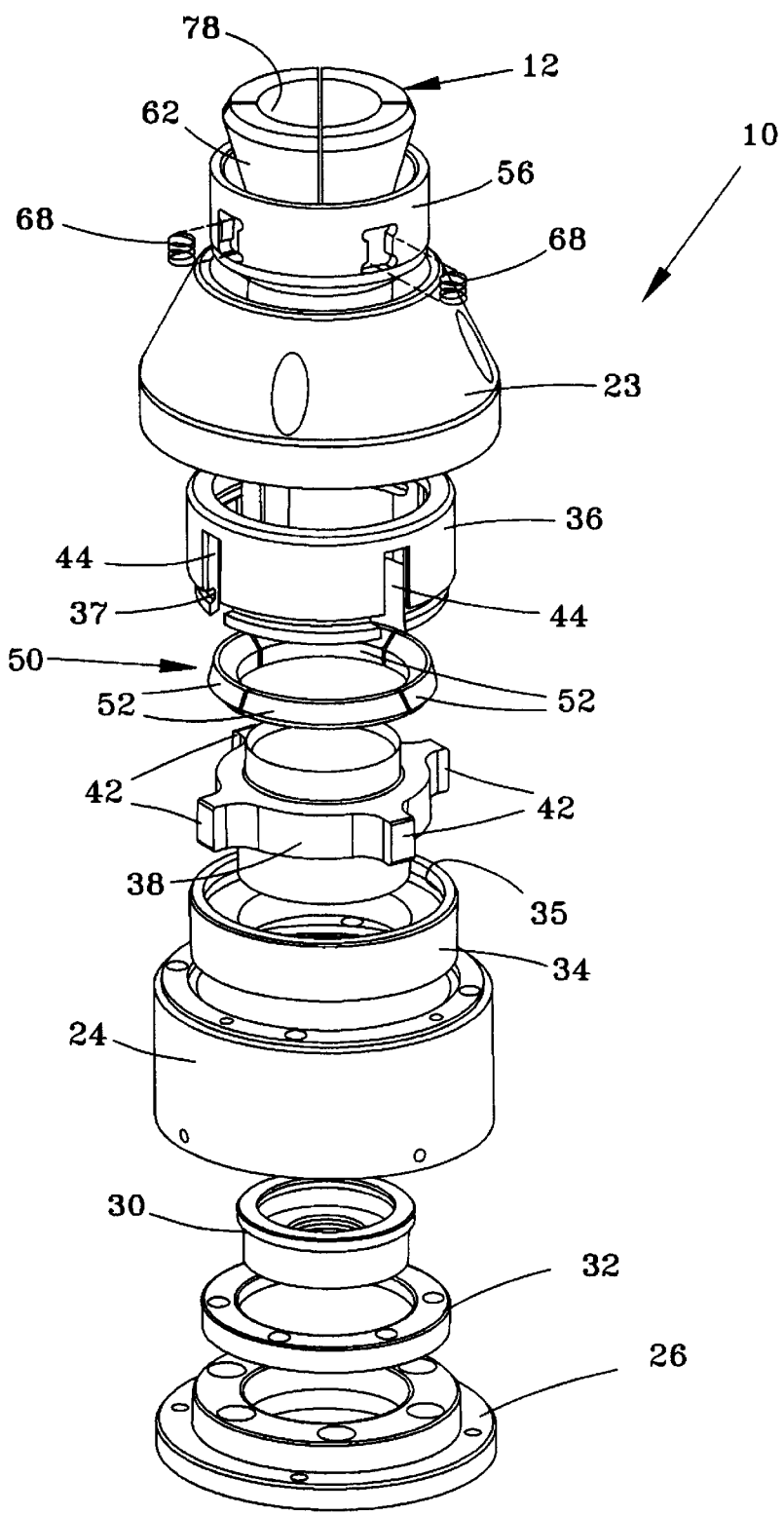
FIG. 2 is an exploded view of the collet chuck of FIG. 1.
Figure 3:
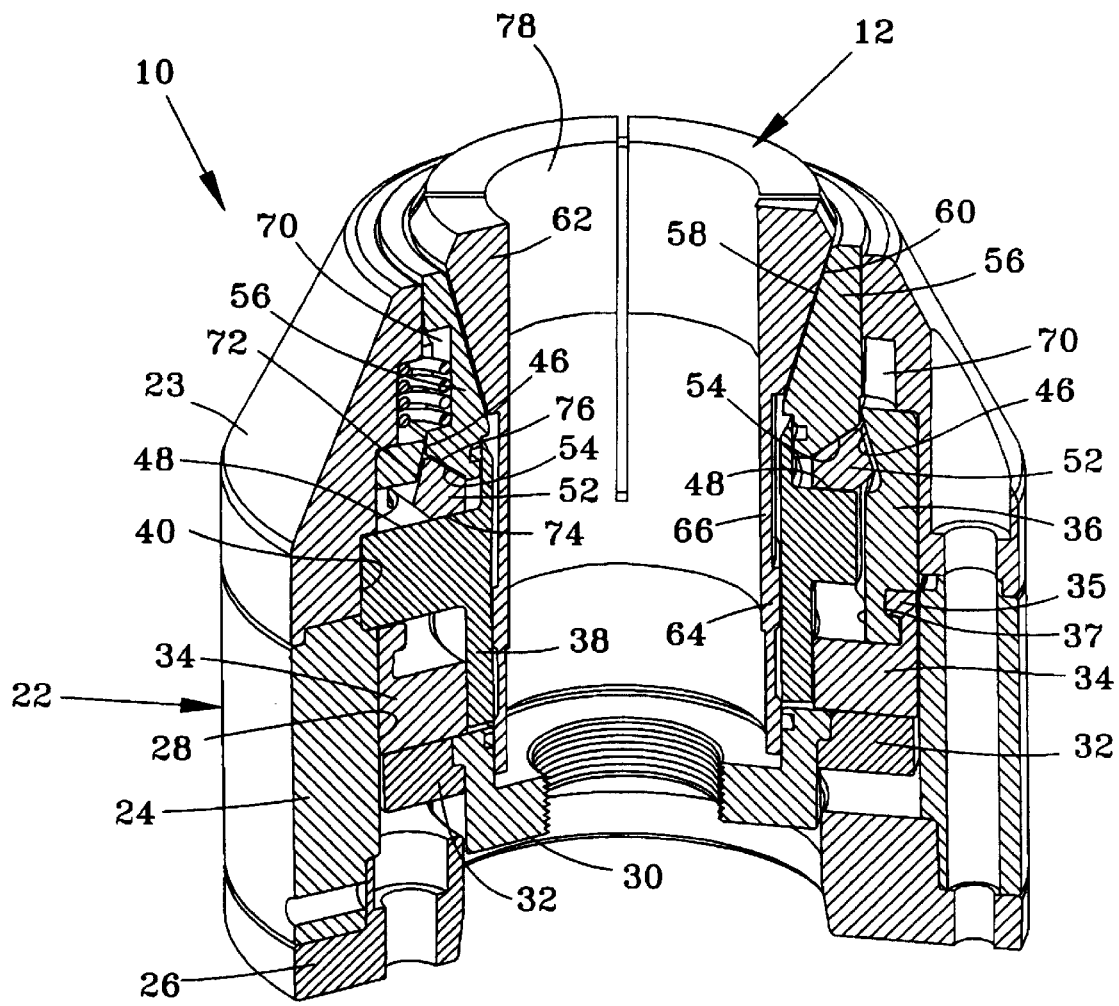
FIG. 3 is a perspective sectional view of the collet chuck of FIG. 1.
Figure 4:
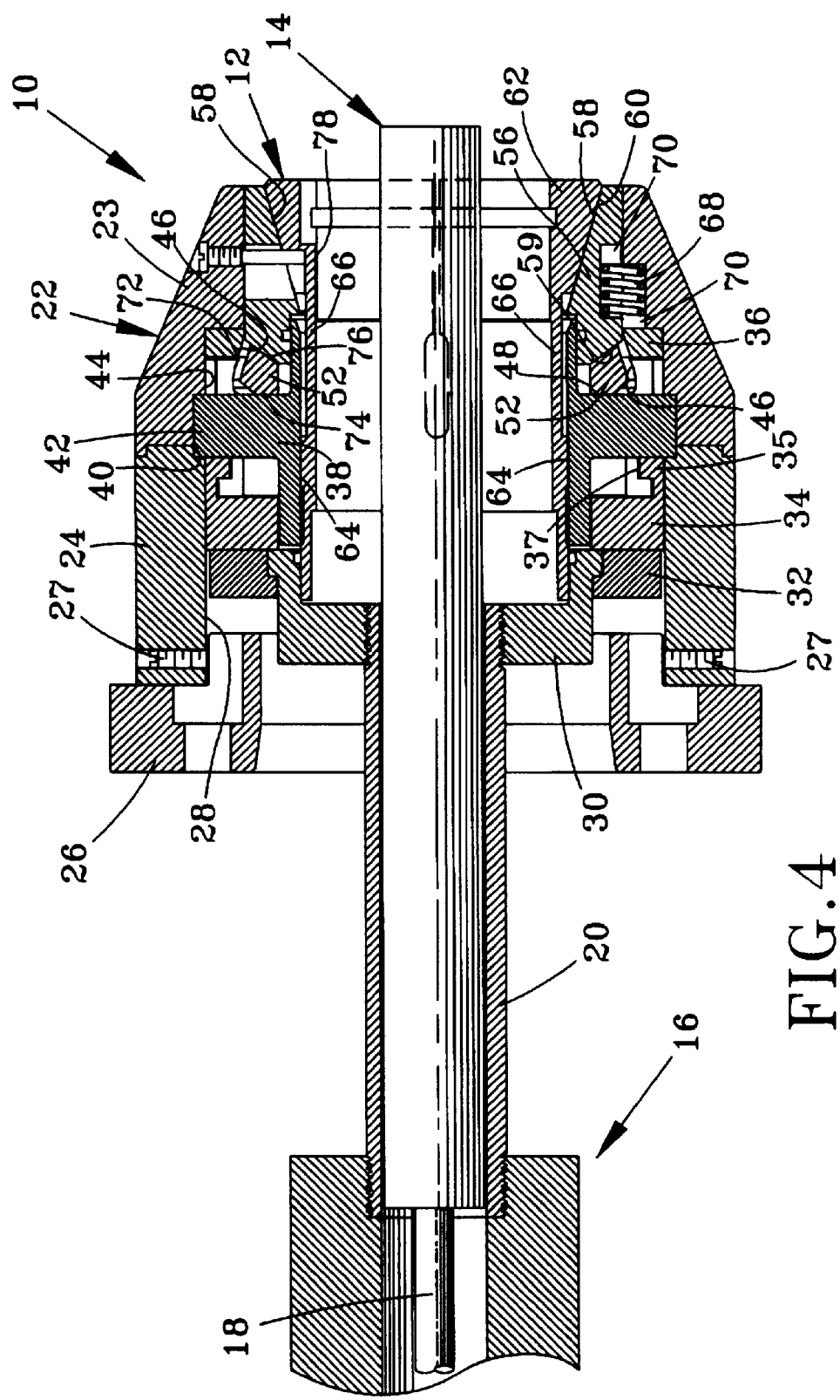
FIG. 4 is a cross-sectional view of the collet chuck of FIG. 1, in which the chuck is shown mounted to a drawtube of a lathe.

FIGS. 1 through 4 show a collet chuck 10 of a type used on computer numerically-controlled (CNC) lathes used for machining bar stock, including steel, brass, aluminum and plastic. As with conventional collet chucks, the chuck 10 closes a collet 12, causing the collet 12 to close around bar stock 14 (represented in FIG. 4). The collet 12 is represented in FIGS. 1 through 3 as being a solid, roughly tubular-shaped body, though as shown in FIG. 4 the collet 12 will typically have equiangularly-spaced slots present in one end to delineate multiple resilient fingers capable of gripping the bar stock 14 disposed within the bore 78 of the collet 12. The collet 12 is typically the only component of the chuck 10 that comes into contact with the bar stock 14. The collet 12 can be solid, dedicated to one size stock, or it can be a master collet that accepts segments that can be changed to alternate the gripping diameter. As known in the art, CNC lathe machines may be equipped with servo-positioning bar loaders 16 that feed the bar stock 14 into the lathe machine (now shown) and position the stock 14 with the use of a stock stop located in the turret of the lathe. When coupled with the servo-positioning bar loader 16, the chuck 10 of this invention does not allow the bar stock 14 to move longitudinally as the chuck 10 closes the collet 12. Instead, the chuck 10 causes the bar stock 14 to be held securely against a stop 18 provided by the bar loader 16 during the closing phase of the chuck 10. As a result, the chuck 10 eliminates the need for a stop provided by the lathe machine.

The chuck 10 includes a housing 22 shown as comprising two housing members 23 and 24 held together with bolts (not shown). The housing 22 is adapted for mounting to the spindle (not shown) of a lathe via a mounting plate 26, which can be readily configured for use with different spindle nose configurations including tapered and cylindrical. The rearmost housing member 24 is preferably equipped with four setscrews 27 (FIG. 4) to adjust the concentricity or run out of the bar stock 14, allowing the lathe operator to virtually eliminate any run out that can occur from bar stock tolerance or manufacturing tolerances within the collet chuck 10. The internal mechanism of the chuck 10 is contained within a central bore 28 within the housing 22, and is connected to an operating cylinder (not shown) on the back of the spindle through a drawtube 20 that is threaded into a drawtube connector 30. The cylinder actuates the drawtube 20 forward to open the chuck 10, and pulls back to close the chuck 10.

The primary components of the collet chuck 10 are illustrated in FIGS. 1 through 4. Omitted are such hardware items as o-rings, screws and grease fittings, which are known by those skilled in the art as being required in the assembling and mounting of the chuck 10 to a lathe spindle. As seen in FIGS. 3 and 4, the drawtube connector 30 is retained in the chuck 10 by a drawtube cap 32. The cap 32 is bolted to a two-piece split ring assembly 34, which in turn is clamp shelled around one end of a piston 36. For this purpose, the ring assembly 34 has an annular flange or lip 35 that is inserted into a groove 37 formed in the outer surface of the piston 36. The connector 30, cap 32, split ring assembly 34 and piston 36 move in unison when the drawtube 20 is actuated. In contrast, a ramp body 38 is held in a fixed position, both rotationally and axially, within the housing bore 28. As shown in FIGS. 2, 3 and 4, the housing members 23 and 24 are formed to have complementary milled pockets that when the members 23 and 24 are assembled define recesses 40 that receive four outward projections 42 of the ramp body 38. The projections 42 key the ramp body 38 to the housing 22 and prevent rotation of the ramp body 38 within the housing bore 28. As more readily seen from FIG. 2, the piston 36 has four longitudinal slots 44 in which the projections 42 are received to allow the piston 36 to be assembled with the ramp body 38 in a concentric arrangement, while also allowing the piston 36 to be actuated longitudinally relative to the ramp body 38.

The piston 36 and the ramp body 38 have bearing surfaces 46 and 48, respectively, contacting a wedge 50 made up of four wedge segments 52, though fewer or more segments 52 could be used. The bearing surface 46 of the piston 36 faces radially inward toward the wedge 50 and has a generally frustroconical shape tapered to have a decreasing diameter away from the ramp body 38. The bearing surface 48 of the ramp body 38 is substantially transverse to the axis of the housing bore 28, though a slight angle to this axis could be used. The wedge segments 52 are shown has having multiple linear surfaces (when viewed in cross-section), three of which are bearing surfaces 72, 74 and 76. A first 72 of the bearing surfaces of each segment 52 contacts the bearing surface 46 of the piston 36, while a second 74 contacts the bearing surface 48 of the ramp body 38. The first bearing surfaces 72 of the wedge segments 52 together yield a composite frustroconical shape that is substantially coaxial with the housing bore 28 and tapered to have a decreasing diameter toward the ramp body 38, thereby complementary to the bearing surface 46 of the piston 36. The second bearing surface 74 of each segment 52 is planar and transverse to the axis of the housing bore 28. As a result of the orientations of the respective bearing surfaces 46, 48, 72 and 74, actuation of the piston 36 toward the stationary ramp body 38 forces the wedge segments 52 radially inward along the bearing surface 48 of the ramp body 38 and toward the collet 12. The third bearing surface 76 of each segment 52 contacts a complementary bearing surface 54 of a pusher body 56. The bearing surfaces 54 and 76 face radially outward and inward, respectively, toward each other, and each has a complementary frustroconical shape tapered to increase in diameter away from the ramp body 38.

The pusher body 56 is accurately guided by the bore 28 of the collect 10 so as to be limited to fore and aft movement. As a result, when the wedge segments 52 are forced inward along the ramp body 38, the pusher body 56 is forced forward away from the ramp body 38. The pusher body 56 is shown has having a second bearing surface 58 at an end opposite the bearing surface 54. The bearing surface 58 also has a frustroconical shape increasing in diameter away from the ramp body 38, and contacts yet another frustroconical bearing surface 60 on a tapered portion 62 of the collet 12. The collet 12 is held fixed within the housing 22 by threads 64 formed on a cylindrical portion 66 of the collet 12 and engaged with the ramp body 38. As a result, the forward motion of the pusher body 56 closes the collet 12, i.e., deflects the tapered portion 62 of the collect radially inward to reduce the internal diameter of the collet bore 78.

To release the bar stock 14, the drawtube 20 is actuated forward toward the chuck 10, which causes the drawtube connector 30, cap 32, split ring assembly 34 and piston 36 to move forward, thereby releasing the radially inward force on the wedge segments 52. Springs 68 housed in complementary cavities 70 in the housing member 23 and the pusher body 56 (FIG. 4) force the pusher body 56 back toward the ramp body 38, allowing the collet 12 to spring open and release the bar stock 14.

Those skilled in the art will appreciate that various materials and surface treatments may be employed to form the components of the chuck 10. Suitable materials include 4140 and 8620 steels, with case hardening of the bearing surfaces to increase wear resistance. In a preferred embodiment, the housing members 23 and 24 are formed of 4140 steel and through-hardened, though it is foreseeable that other materials and a different heat treatment could be used.

In view of the above, the collet chuck 10 of this invention can be understood to incorporate several significant features. The chuck 10 is designed to work specifically with servo-type bar loaders and eliminates the need for a stop in a lathe. The chuck 10 incorporates dead length positioning, meaning that the bar stock 14 does not move when the chuck 10 (collet 12) closes. Importantly, the segmented wedge 50 provides for surface-to-surface contact with the mating bearing surfaces 46, 48 and 54 of the piston 36, ramp body 38 and pusher body 56, instead of the point or line contact provided with the use of ball and roller bearings. Though this surface-to-surface contact increases internal friction, the chuck 10 is surprisingly efficient with respect to generating desirable gripping loads at the tapered end 62 of the collet 12. In addition, the manner in which the ramp body 38 is secured within the housing 22 with integral projections greatly increases the gripping force that can be generated at the collet 12 while achieving the true positioning capability desired for the chuck 10. The chuck 10 also has adjustable concentricity to eliminate run out in the bar stock 14, and has o-ring protection on the collet 12 and other internal components to reduce chip build-up from the machining operation. Adjustable grip force is possible by varying the pressure from the cylinder.

While the invention has been described in terms of a preferred embodiment, it is apparent that other forms could be adopted by one skilled in the art. Accordingly, the scope of the invention is to be limited only by the following claims.

What is claimed is:

1. A chuck comprising:
    a housing with a bore therein that defines a longitudinal axis;
    a collet disposed within the housing, the collet having a first portion, a collapsible second portion, and a collet bore therein substantially coaxial with the bore of the housing;
    a ramp body within the bore and surrounding the first portion of the collet, the ramp body having integral securing means for securing the ramp body to the housing, the ramp body having a ramp surface substantially transverse to the longitudinal axis of the housing;
    second means for securing the collet to the ramp body so that the integral securing means and the second securing means substantially prevent longitudinal movement of the ramp body and the collet within the housing;
    a piston reciprocable within the bore and surrounding the collet, the piston having a bearing surface adjacent the ramp surface of the ramp body;
    means for longitudinally actuating the piston within the bore;
    a wedge within the housing between the ramp surface of the ramp body and the bearing surface of the piston, the wedge having multiple bearing surfaces providing surface-to-surface contact, a first bearing surface camming against the bearing surface of the piston, a second bearing surface camming against the ramp surface of the ramp body, and a third bearing surface, the ramp surface of the ramp body, the bearing surface of the piston, and the first and second bearing surfaces of the wedge being operable to cause the wedge to move radially inward toward the collet when the piston moves toward the ramp body;
    pusher means within the bore and engaged with the third bearing surface of the wedge for causing the second portion of the collet to collapse radially inward to grip a workpiece disposed within the collet bore when the wedge moves radially inward toward the collet.

2. A chuck according to claim 1, wherein the integral securing means of the ramp body comprises multiple projections radially extending from the ramp body, and wherein the housing comprises recesses in the bore for receiving the multiple projections.

3. A chuck according to claim 2, wherein the ramp surface is defined on surfaces of the multiple projections.

4. A chuck according to claim 1, wherein the second securing means comprises complementary threads on the collet and the ramp body.

5. A chuck according to claim 1, wherein the piston surrounds the ramp body and comprises a first portion on which the bearing surface is defined and a second portion engaged with the actuating means.

6. A chuck according to claim 5, wherein the actuating means comprises a split ring assembly having flanges that extend radially inward to engage the second portion of the piston.

7. A chuck according to claim 1, wherein the pusher means comprises a pusher body reciprocable within the bore and surrounding the second portion of the collet.

8. A chuck according to claim 7, wherein the pusher body comprises a first camming surface camming against the third bearing surface of the wedge and a second camming surface contacting the second portion of the collet, the first camming surface of the pusher body and the third bearing surface of the wedge being operable to cause the pusher body to move longitudinally away from the ramp body and into engagement with the second portion of the collet when the wedge moves radially inward toward the collet, causing the second portion of the collet to collapse radially inward to grip the workpiece within the collet bore.

9. A chuck according to claim 1, wherein the wedge comprises multiple wedge members not connected to each other, each wedge member having portions of the first, second and third bearing surfaces.

10. A pull-to-close dead-length collet chuck comprising:
    a housing with a bore therein that defines a longitudinal axis;
    a collet disposed within the housing, the collet having a first portion, a tapered portion, and a collet bore therein substantially coaxial with the bore of the housing;
    a ramp body within the bore and surrounding the first portion of the collet, the ramp body having integral securing means for securing the ramp body to the housing, the ramp body having a ramp surface substantially transverse to the longitudinal axis of the housing;
    second means for securing the collet to the ramp body so that the integral securing means and the second securing means substantially prevent longitudinal movement of the ramp body and the collet within the housing;
    a piston reciprocable within the bore and surrounding the collet, the piston having a bearing surface adjacent the ramp surface of the ramp body;
    means for longitudinally actuating the piston within the bore;
    a wedge within the housing between the ramp surface of the ramp body and the bearing surface of the piston, the wedge having multiple bearing surfaces providing surface-to-surface contact, a first bearing surface camming against the bearing surface of the piston, a second bearing surface camming against the ramp surface of the ramp body, and a third bearing surface, the ramp surface of the ramp body, the bearing surface of the piston, and the first and second bearing surfaces of the wedge being operable to cause the wedge to move radially inward toward the collet when the piston moves toward the ramp body;
    a pusher body reciprocable within the bore and surrounding the tapered portion of the collet, the pusher body having a first camming surface camming against the third bearing surface of the wedge and a second camming surface contacting the tapered portion of the collet, the first camming surface of the pusher body and the third bearing surface of the wedge being operable to cause the pusher body to move longitudinally away from the ramp body and into engagement with the tapered portion of the collet when the wedge moves radially inward toward the collet, causing the tapered portion of the collet to collapse radially inward to grip a workpiece disposed within the collet bore.

11. A pull-to-close dead-length collet chuck according to claim 10, wherein the integral securing means of the ramp body comprises multiple projections radially extending from the ramp body, and wherein the housing comprises recesses in the bore for receiving the multiple projections.

12. A pull-to-close dead-length collet chuck according to claim 11, wherein the ramp surface is defined on surfaces of the multiple projections.

13. A pull-to-close dead-length collet chuck according to claim 11, wherein the housing comprises first and second housing members, and the recesses are formed by complementary pockets in each of the first and second housing members.

14. A pull-to-close dead-length collet chuck according to claim 10, wherein the second securing means comprises complementary threads on the collet and the ramp body.

15. A pull-to-close dead-length collet chuck according to claim 10, wherein the piston surrounds the ramp body and comprises a first portion on which the bearing surface is defined and a second portion engaged with the actuating means.

16. A pull-to-close dead-length collet chuck according to claim 15, wherein the actuating means comprises a split ring assembly having flanges that extend radially inward to engage the second portion of the piston.

17. A pull-to-close dead-length collet chuck according to claim 16, wherein the actuating means further comprises a drawtube of a lathe.

18. A pull-to-close dead-length collet chuck according to claim 10, wherein the wedge comprises multiple wedge members not connected to each other, each wedge member having portions of the first, second and third bearing surfaces.

19. A pull-to-close dead-length collet chuck comprising:

a housing comprising first and second housing members and a bore having a longitudinal axis, the first and second housing members having complementary pockets that define recesses in the bore;

a collet disposed within the housing, the collet having a cylindrical portion and a tapered portion that define a collet bore substantially coaxial with the bore of the housing, the cylindrical portion having threads on an outer surface thereof, the tapered portion defining a frustroconical outer surface adjacent an end of the collet and substantially coaxial with the collet bore;

a ramp body within the bore and surrounding the cylindrical portion of the collet, the ramp body having threads threadably engaged with the threads of the collet, the ramp body having multiple radially-extending projections received in the recesses of the housing to secure the ramp body to the housing and substantially prevent longitudinal movement of the ramp body within the housing, the multiple projections defining ramp surfaces that are each substantially transverse to the longitudinal axis of the housing;

a piston reciprocable within the bore and surrounding the ramp body, the piston comprising a first portion and a second portion on opposite sides of the projections of the ramp body, the first portion of the piston defining a bearing surface adjacent the ramp surface of the ramp body, the bearing surface having a frustroconical shape that is substantially coaxial with the collet bore and is tapered to have an increasing diameter toward the ramp body;

a split ring assembly having flanges that extend radially inward to engage the second portion of the piston;

means secured to the split ring assembly for longitudinally actuating the piston within the bore;

multiple wedges within the housing between the ramp surface of the ramp body and the bearing surface of the piston, each wedge having multiple bearing surfaces providing surface-to-surface contact, a first bearing surface having a frustroconical shape and camming against the bearing surface of the piston, a second bearing surface being substantially parallel to and camming against the ramp surface of the ramp body, and a third bearing surface having a frustroconical shape that is substantially coaxial with the collet bore and is tapered to have a decreasing diameter toward the ramp body, the ramp surface of the ramp body, the bearing surface of the piston, and the first and second bearing surfaces of the wedges being operable to cause each of the wedges to move radially inward toward the collet when the piston moves toward the ramp body;

a pusher body reciprocable within the bore and surrounding the collet, the pusher body having a first camming surface camming against the third bearing surface of each wedge and a second camming surface contacting the frustroconical outer surface of the collet, the first camming surface of the pusher body and the third bearing surfaces of the wedges being operable to cause the pusher body to move longitudinally away from the ramp body and into engagement with the frustroconical outer surface the collet when the wedges move radially inward toward the collet, causing the tapered portion of the collet to collapse radially inward to grip a workpiece disposed within the collet bore.

20. A pull-to-close dead-length collet chuck according to claim 19, wherein the means for longitudinally actuating the piston further comprises a drawtube of a lathe.

* * * * *